United States Patent
Morsches et al.

(10) Patent No.: US 6,949,026 B2
(45) Date of Patent: Sep. 27, 2005

(54) AXIALLY COMPLIANT ISOLATOR

(75) Inventors: Michael R. Morsches, Trumbull, CT (US); David A. Kulczyk, Torrington, CT (US); Jay C. Files, Windsor, CT (US)

(73) Assignee: Timken US Corporation, Torrington, CT (US)

( * ) Notice: Subject to any disclaimer, the term of this patent is extended or adjusted under 35 U.S.C. 154(b) by 0 days.

(21) Appl. No.: 09/739,441

(22) Filed: Dec. 18, 2000

(65) Prior Publication Data

US 2002/0077184 A1 Jun. 20, 2002

(51) Int. Cl.⁷ .............................. F16D 3/06; F16D 3/76
(52) U.S. Cl. ..................... 464/75; 464/112; 464/162
(58) Field of Search ............... 464/74, 75, 112, 464/134, 162; 403/225, 298, 362

(56) References Cited

U.S. PATENT DOCUMENTS

| | | | |
|---|---|---|---|
| 2,199,926 A | * | 5/1940 | Swennes .................. 464/75 |
| 2,371,330 A | * | 3/1945 | Irstad .................. 464/167 X |
| 3,001,387 A | * | 9/1961 | Schultz .................. 464/167 |
| 3,246,484 A | * | 4/1966 | Haddad et al. ............. 464/134 |
| 3,618,340 A | | 11/1971 | Geisthoff et al. |
| 3,867,050 A | | 2/1975 | Pitner |
| 3,871,192 A | * | 3/1975 | Muhr et al. ............... 464/134 |
| 3,878,695 A | | 4/1975 | Pitner |
| 3,942,336 A | | 3/1976 | Schultenkamper |
| 4,136,533 A | | 1/1979 | Okuda |
| 4,479,786 A | | 10/1984 | DeBisschop |
| 4,483,685 A | | 11/1984 | Spasiano et al. |
| 4,551,115 A | | 11/1985 | Ferguson |
| 4,844,193 A | | 7/1989 | Veselica et al. |
| 4,983,143 A | | 1/1991 | Sekine et al. |
| 5,115,691 A | * | 5/1992 | Beuch ................... 464/162 X |
| 5,259,818 A | | 11/1993 | Kachi et al. |
| 5,366,316 A | | 11/1994 | Cymbal |
| 5,452,623 A | | 9/1995 | Knight |
| 5,647,683 A | | 7/1997 | Easley |
| 5,692,959 A | | 12/1997 | Schabel |
| 5,720,638 A | | 2/1998 | Hale |
| 5,823,703 A | | 10/1998 | Thomas et al. |
| 5,836,821 A | | 11/1998 | Yamada et al. |
| 5,836,823 A | | 11/1998 | Shellaberger |
| 5,902,186 A | | 5/1999 | Gaukel |
| 5,904,622 A | | 5/1999 | Breese et al. |
| 5,931,052 A | | 8/1999 | Zhao et al. |
| 5,946,977 A | | 9/1999 | Sato et al. |
| 5,951,402 A | | 9/1999 | Baldwin et al. |
| 6,022,047 A | | 2/2000 | Okubo |
| 6,186,694 B1 | | 2/2001 | Couallier et al. |
| 6,190,263 B1 | | 2/2001 | Kimoto et al. |
| 6,241,616 B1 | * | 6/2001 | Lightcap ................... 464/162 |

FOREIGN PATENT DOCUMENTS

| | | | | |
|---|---|---|---|---|
| DE | 1400874 | * | 5/1963 | ............. 403/362 |
| FR | 1031226 | * | 6/1953 | ............. 403/225 |
| FR | 1249781 | * | 11/1960 | ............. 464/162 |

* cited by examiner

*Primary Examiner*—Lynne H. Browne
*Assistant Examiner*—Greg Binda
(74) *Attorney, Agent, or Firm*—Michael Best & Friedrich LLP

(57) ABSTRACT

A housing has a longitudinally extending aperture and at least one internal, longitudinally extending groove. At least one longitudinally extending blade is mountable on the shaft and positioned within the housing such that the blade extends radially outwardly into the longitudinal groove of the housing. A cross pin extends radially through the longitudinally extending aperture of the housing for engagement with the shaft, and a resilient material is positioned between the housing and the blade, and between the cross pin and the housing, such that the blade will transmit torque to the housing with a desired radial, axial and torsional compliance.

10 Claims, 4 Drawing Sheets

AXIALLY COMPLIANT ISOLATOR

BACKGROUND OF THE INVENTION

This invention relates generally to couplings for shafts that provide isolation of noise, vibration and harshness, and, more particularly, to such couplings that are suitable for motor vehicle steering columns.

Typically, motor vehicle steering columns include a disk type isolator that comprises a rubber disk that is mounted between two shafts. The shafts have radially extending arms that are fixed to the disk, the radially extending arms of the two shafts being displaced 90 degrees from each other. Such isolators are effective in providing acceptable levels of radial, axial and torsional compliance. However, the high complexity and large size of such devices makes them expensive to produce and too bulky to fit within modern compact steering column assemblies.

Alternatively, motor vehicle steering columns have used a tubular bushing type isolator. Typically, one shaft is pinned within a sleeve or tubular yoke that is fixed to a second shaft, and a rubber or elastomer bushing is positioned therebetween. Such isolators provide a desired compact size and reduced cost compared to disk type isolators. However, the tubular bushing type isolators do not provide sufficient torsional stiffness. More specifically, when the bushing provides sufficient compliance in the radial and axial directions, the torsional compliance is unacceptable.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an axially compliant isolator for a shaft, the isolator comprising a housing having an axis, a longitudinally extending aperture and at least one internal, longitudinally extending groove. At least one longitudinally extending blade is mountable on the shaft and positioned within the housing such that the blade extends radially outwardly into the longitudinal groove of the housing. A cross pin extends radially through the longitudinally extending aperture of the housing for engagement with the shaft, and a resilient material is positioned between the housing and the blade, and between the cross pin and the housing, such that the blade will transmit torque to the housing with a desired radial, axial and torsional compliance.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
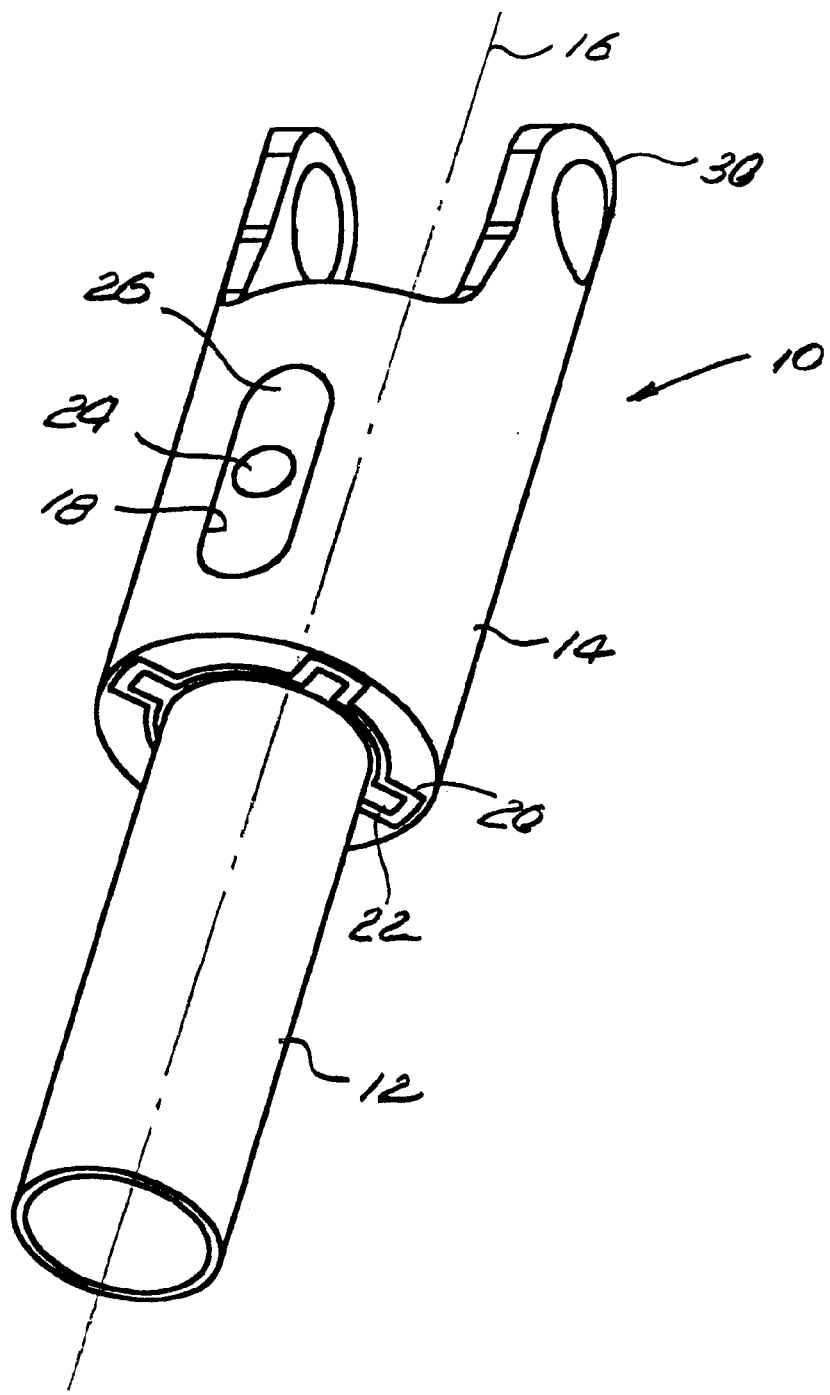
FIG. 1 is a pictorial view of an axially compliant isolator mounted on a shaft, illustrating the present invention.
Figure 2:
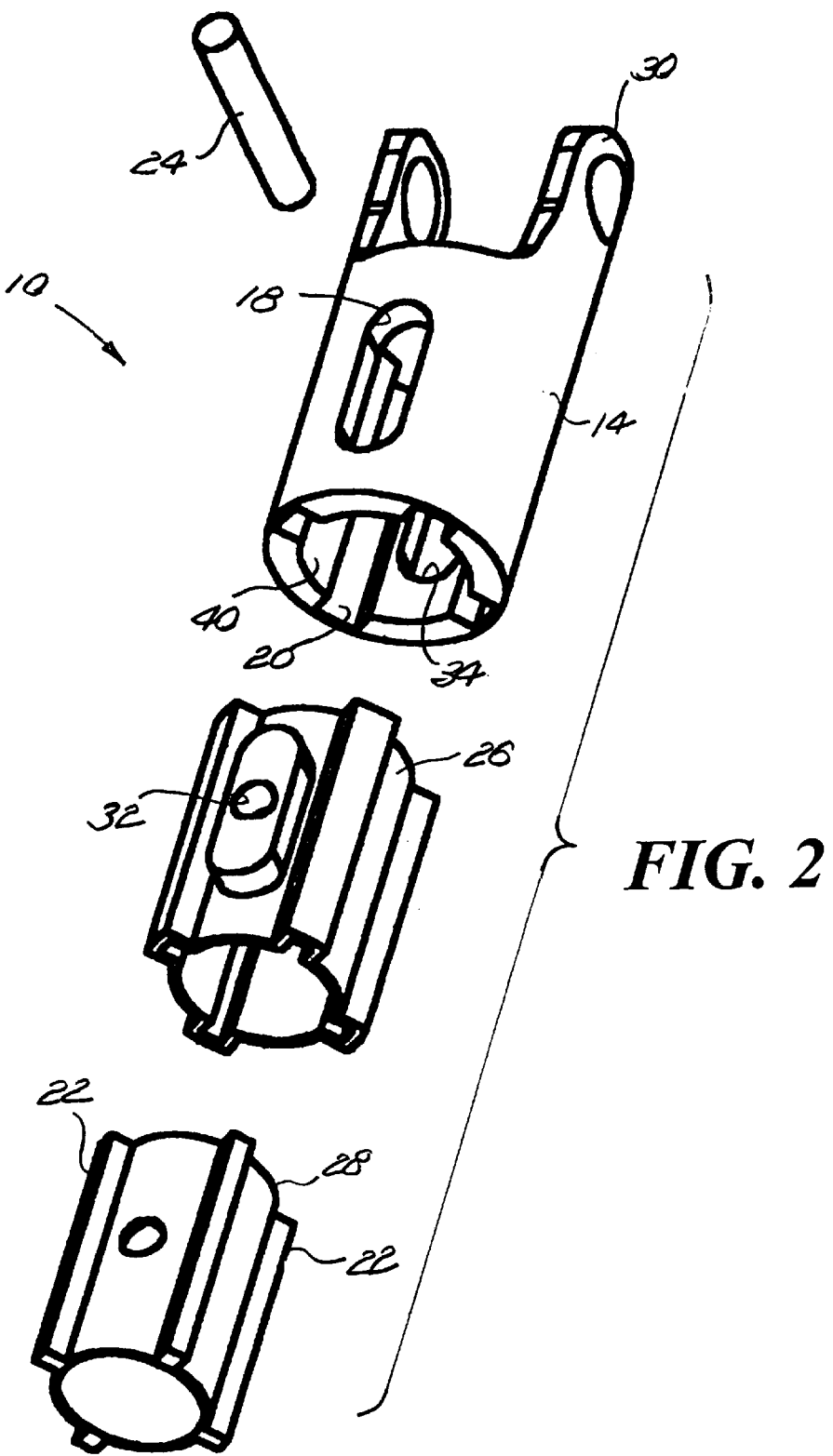
FIG. 2 is an exploded view of the axially compliant isolator of FIG. 1.
Figure 3:
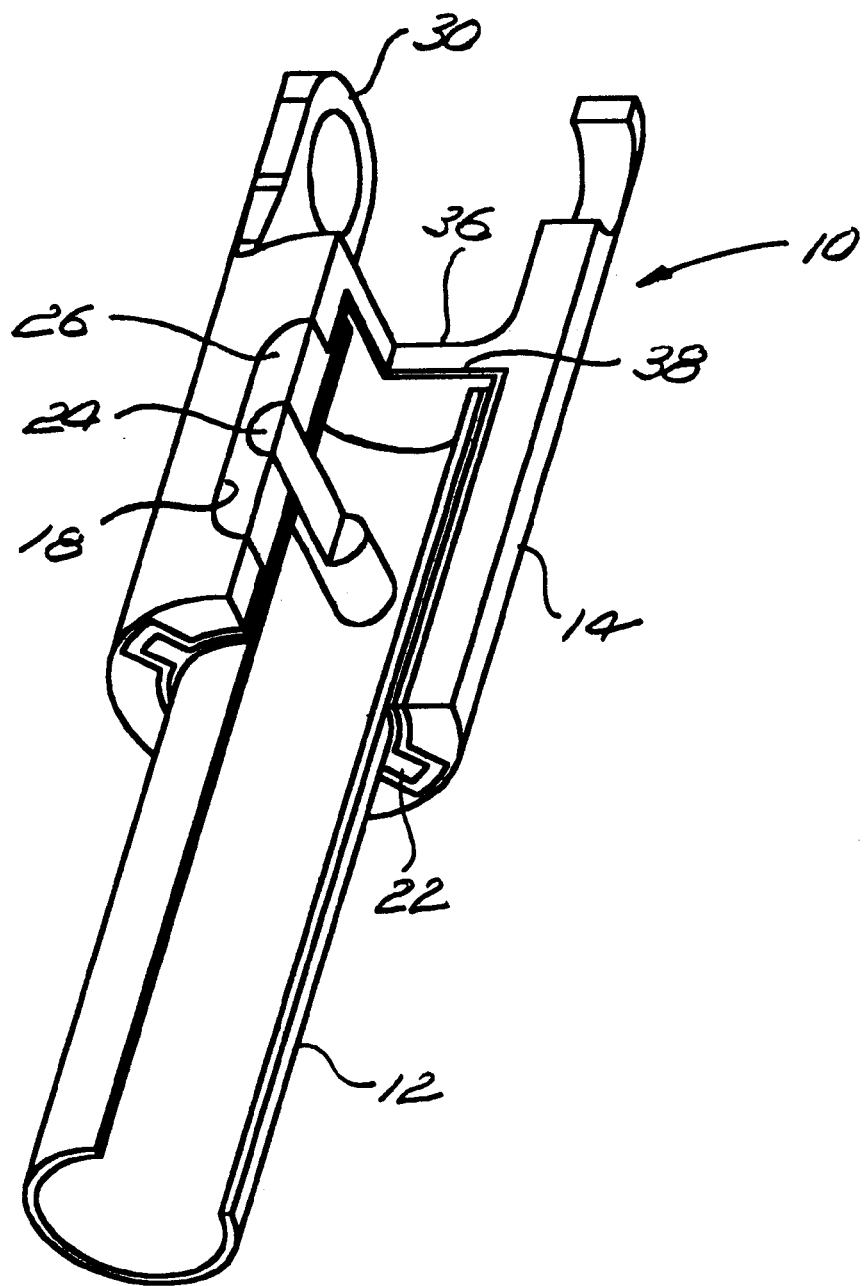
FIG. 3 is a cut-away view of the axially compliant isolator and shaft of FIG. 1.
Figure 4:
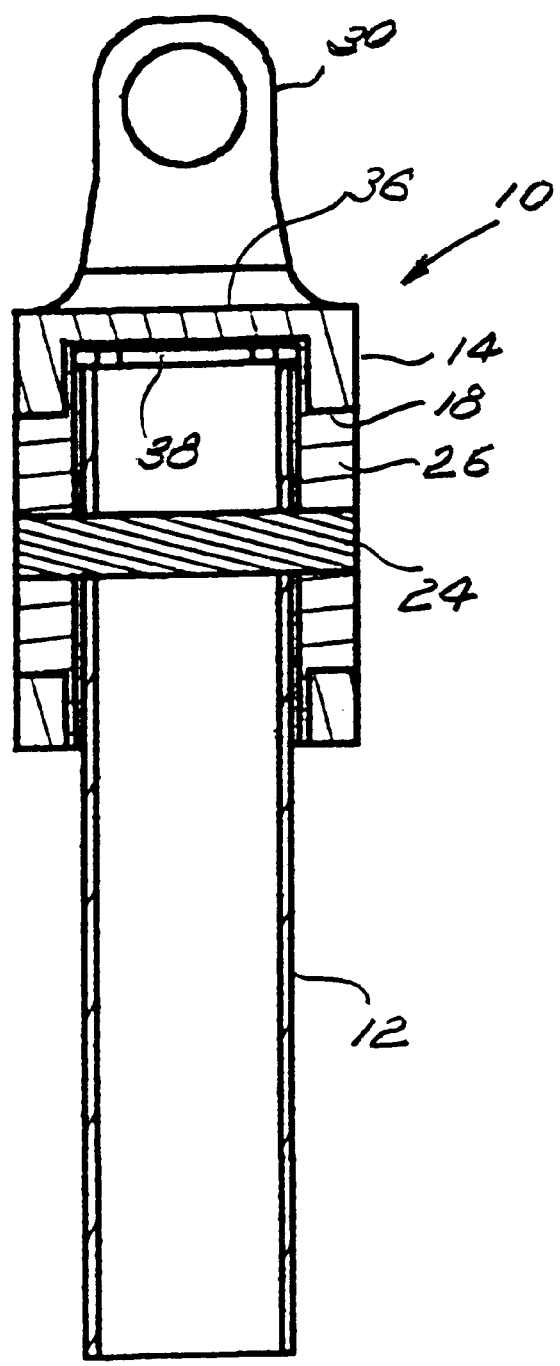
FIG. 4 is a cross sectional view of the axially compliant isolator and shaft of FIG. 1.

Referring now to the drawings, FIGS. 1, 2 and 3 illustrate an axially compliant isolator 10 according to the present invention and mounted on a shaft 12.

The axially compliant isolator 10 comprises a housing 14 with an axis 16, a longitudinally extending aperture 18 and at least one internal, longitudinally extending groove 20. At least one longitudinally extending blade 22 is positioned within the housing 14, corresponding to the number of groove(s) 20, and a cross pin 24 extends through the aperture 18 of the housing 14 and into the shaft 12. A resilient material 26, rubber or elastomer, for example, is positioned between the blade 22 and the housing 14 and between the cross pin 24 and the housing 14.

The blade(s) 22 may be mounted or formed directly on the shaft 12, or may be formed on a tubular spool 28, as illustrated, that may be pressed onto the shaft 12. The blade(s) 22 and longitudinally extending groove(s) 20 may be four in number, distributed regularly, angularly with respect to the axis 16, with a generally square cross-section, as illustrated, for example, or may of various numbers and configurations with similar effect. The blade(s) 22 and tubular spool 28 may be formed of steel for strength and coated with Teflon (i.e. polytetrafluoroethylene) to facilitate insertion into the resilient material 26 that separates the blade(s) 22 and tubular spool 28 from the housing 14.

The housing 14 may have optional axially extending ears 30 for mounting a cross of a universal joint, for example, making the housing a part of what is known as a tube yoke, and may be formed of aluminum or steel, by casting, machining or extruding or other processes. Preferably, the resilient material 26 is a thermoset synthetic rubber that is molded and bonded to the housing 14, that forms the primary mold for the resilient material 26. The cross pin 24 may be pressed through the longitudinally extending aperture 18 and into a preformed hole 32 of the resilient material 26 after the shaft 12 and/or tubular spool 28 are pressed into the resilient material 26.

If the cross pin 24 extends completely through the housing 14 along a diameter, as shown, the longitudinally extending aperture 18 is supplemented with an optional corresponding longitudinally extending aperture 34 diametrically opposite the aperture 18. Alternatively, the cross pin 24 may terminate within the shaft 12. The apertures 18 and 34 may be pierced or machined. As shown in FIG. 3, the resilient material 26 may extend along a closed end 36 of the housing 14, as an end wall 38, and the shaft 12 may be axially spaced from the end wall 38, to enhance axial compliance of the axially compliant isolator 10.

Torsional compliance is created by the blades 22 compressing the resilient material 26 in the housing 14 and is tuned by adjusting the thickness of the resilient material 26 between the blades 22 and the housing 14 by varying the width of the longitudinally extending groove(s) 20. Axial compliance is created by the cross pin 24 compressing the resilient material 26 in the housing 14 and is tuned by the length of the longitudinally elongated apertures 18 and 34. Radial compliance is created by the relatively thin layer of the resilient material 26 between a bore 40 of the housing 14 and the shaft 12 or tubular spool 28.

The present invention is capable of providing a very soft axial compliance while maintaining a relatively stiff torsional compliance, to meet or exceed the specifications for new motor vehicle steering column assemblies. The radial, axial and torsional stiffness is tunable for varying levels of compliance. The isolator of the present invention provides acceptable levels of isolation of noise, vibration and harshness with a compact device that avoids the complexity and high cost of current disk type isolators.

Having described the invention, what is claimed is:

1. An axially compliant isolator for a shaft, the isolator comprising:
    a housing having an axis, a longitudinally extending aperture and at least one internal, longitudinally extending groove;
    at least one longitudinally extending blade mountable on the shaft and positioned within the housing, extending radially outwardly into the at least one longitudinal groove of the housing;
    a cross pin extending radially through the longitudinally extending aperture of the housing for engagement with the shaft; and
    a resilient material positioned between the housing and the blade, and between the cross pin and the housing, such that the blade will transmit torque to the housing with a desired radial, axial and torsional compliance.

2. The axially compliant isolator according to claim 1, wherein the at least one longitudinally extending blade is a part of a tubular spool that is mountable on the shaft.

3. The axially compliant isolator according to claim 2, wherein the at least one longitudinally extending blade and tubular spool are coated with polytetrafluoroethylene to facilitate insertion axially into the resilient material.

4. The axially compliant isolator according to claim 1, wherein the number of the at least one longitudinally extending blade(s) is four, the longitudinally extending blades being regularly spaced angularly with respect to the axis.

5. The axially compliant isolator according to claim 1, wherein the at least one longitudinally extending blade has a generally square cross-section and the at least one longitudinally extending groove has a generally square configuration.

6. The axially compliant isolator according to claim 1, wherein the housing has, diametrically opposite said longitudinally extending aperture, a second longitudinally extending aperture into which the cross pin extends.

7. The axially compliant isolator according to claim 1, wherein the housing has axially extending ears such that the housing forms a part of a tube yoke.

8. The axially Compliant isolator according to claim 1, wherein the resilient material is molded within the housing such that the housing forms a part of the mold and the resilient material bonds to the housing.

9. The axially compliant isolator according to claim 1, wherein the resilient material is a thermoset synthetic rubber.

10. The axially compliant isolator according to claim 1, wherein the at least one longitudinally extending blade is coated with polytetrafluoroethylene to facilitate insertion of the blade and shaft axially into the resilient material.

* * * * *

UNITED STATES PATENT AND TRADEMARK OFFICE
CERTIFICATE OF CORRECTION

| | | |
|---|---|---|
| PATENT NO. | : 6,949,026 B2 | Page 1 of 1 |
| APPLICATION NO. | : 09/739441 | |
| DATED | : September 27, 2005 | |
| INVENTOR(S) | : Michael R. Morsches, David A. Kulczyk and Jay C. Files | |

It is certified that error appears in the above-identified patent and that said Letters Patent is hereby corrected as shown below:

Title page,
Item [56], References Cited, U.S. PATENT DOCUMENTS insert
-- 4,915,536 *    4/1990    Bear, et al. --.
FOREIGN PATENT DOCUMENTS, insert:
-- GB   2322687      9/1998
   SU   1751513      7/1992 --.

Signed and Sealed this

Twenty-seventh Day of June, 2006

JON W. DUDAS
*Director of the United States Patent and Trademark Office*